No. 733,484. PATENTED JULY 14, 1903.
M. E. HUNTER.
HANDSAW HANDLE.
APPLICATION FILED SEPT. 2, 1902.
NO MODEL.
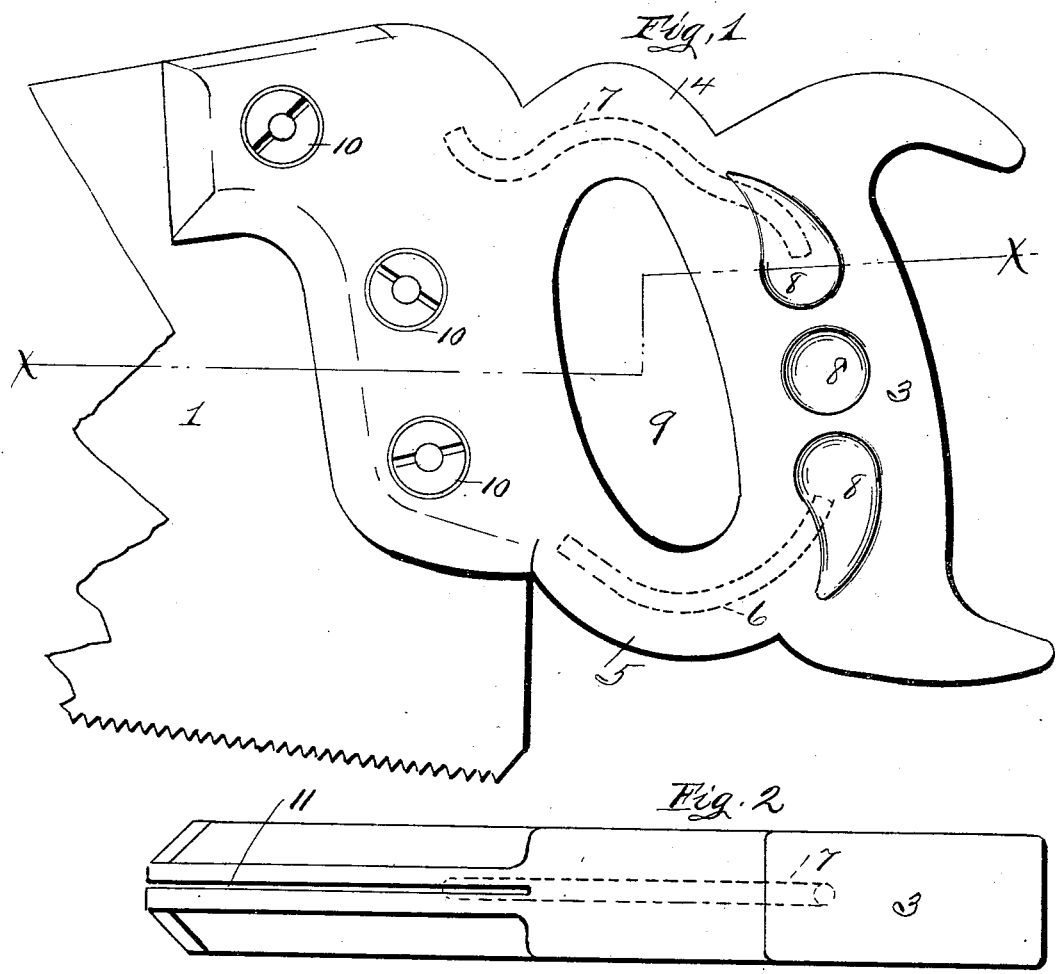
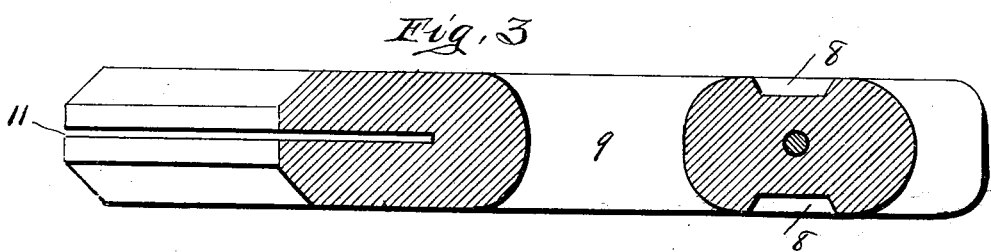

No. 733,484. Patented July 14, 1903.

UNITED STATES PATENT OFFICE.

MARK E. HUNTER, OF ALLEGHENY, PENNSYLVANIA.

HANDSAW-HANDLE.

SPECIFICATION forming part of Letters Patent No. 733,484, dated July 14, 1903.

Application filed September 2, 1902. Serial No. 121,704. (No model.)

*To all whom it may concern:*

Be it known that I, MARK E. HUNTER, a citizen of the United States, residing at Allegheny, in the county of Allegheny and State of Pennsylvania, have invented a new and useful Improvement in Handsaw-Handles, of which improvement the following is a specification.

This invention relates to an improved handsaw-handle; and it consists in forming the same of a flexible material, such as soft rubber, reinforced by metallic strips or pieces, thereby forming a non-breakable and elastic handle, and the invention further consists in the certain details of construction and combination of parts, as will be fully described hereinafter.

In the accompanying drawings, Figure 1 is a side elevation of my improved handsaw-handle, constructed and arranged in accordance with my invention. Fig. 2 is an edge view of the same. Fig. 3 is a similar sectional view, the said section taken on the line X X of Fig. 1.

To put my invention into practice, I provide, by means of suitable molds, a soft-rubber saw-handle, the contour of which is identical with that now in common use, the said handle being provided with a slot 11 for the insertion of the saw-blade 1, and said blade attached in position by means of the screws 10 in a manner well known in the art. This handle is formed with the usual finger-opening 9, forming grip 3, and the handle may be ornamented and lightened by depressions such as are shown at 8. At the time of molding this handle strong pieces of wire 6 and 7 and suspended within the mold in a position that when the handle is complete will reinforce the weak portions 4 and 5 directly opposite the finger-opening 9. These pieces are bent to conform with the contour of the handle and may be round, square, or flat, as desired.

The advantage of a handle constructed as described is its elasticity, preventing vibration and jarring of the hand of the operator, and also that it is non-breakable and may be detached from one saw-blade to another and is practicably indestructible.

Various slight modifications and changes may be made in the details of construction without departing from the spirit of the invention.

Having thus described my invention, what I claim, and desire to secure by Letters Patent, is—

1. A saw-handle formed wholly of soft rubber having a finger-opening formed therein, and reinforcing-strip conforming with the shape of the handle embedded therein above and below the said finger-opening, the ends of the strip extending into the grip of the handle, the said grip provided on its opposite sides with depressions.

2. A saw-handle formed of soft rubber having a finger-opening formed therein, and a reinforcing-wire embedded in the handle above and below said opening, substantially as described.

In testimony whereof I have hereunto signed my name in the presence of two subscribing witnesses.

MARK E. HUNTER.

In presence of—
LOUIS MOESER,
M. HUNTER.